(12) United States Patent
Van Sprang et al.

(10) Patent No.: US 11,273,528 B2
(45) Date of Patent: Mar. 15, 2022

(54) MOTOR SPINDLE

(71) Applicant: FRANZ KESSLER GMBH, Bad Buchau (DE)

(72) Inventors: Joachim Van Sprang, Ravensburg (DE); Udo Tüllmann, Eisenach (DE); Eugen Fetsch, Biberach (DE)

(73) Assignee: Franz Kessler GmbH, Bad Buchau (DE)

( * ) Notice: Subject to any disclaimer, the term of this patent is extended or adjusted under 35 U.S.C. 154(b) by 212 days.

(21) Appl. No.: 16/377,550

(22) Filed: Apr. 8, 2019

(65) Prior Publication Data

US 2019/0232445 A1 Aug. 1, 2019

Related U.S. Application Data

(63) Continuation of application No. PCT/EP2017/076423, filed on Oct. 17, 2017.

(30) Foreign Application Priority Data

Oct. 18, 2016 (DE) ...................... 10 2016 119 821.8

(51) Int. Cl.
*B23Q 1/70* (2006.01)
*B23Q 5/04* (2006.01)
(Continued)

(52) U.S. Cl.
CPC ............. *B23Q 1/70* (2013.01); *B23Q 1/0027* (2013.01); *B23Q 1/44* (2013.01); *B23Q 5/045* (2013.01);
(Continued)

(58) Field of Classification Search
CPC ... Y10T 409/309352; Y10T 409/30448; Y10T 408/95; Y10T 409/309296;
(Continued)

(56) References Cited

U.S. PATENT DOCUMENTS 5,636,949 A * 6/1997 Nakamura ............... B23Q 1/70
408/239 A
5,697,739 A * 12/1997 Lewis .................... B23Q 5/045
409/230
(Continued)

FOREIGN PATENT DOCUMENTS

DE 3002060 A1 * 10/1980 ............. B23Q 5/045
DE 198 50 708 C2 10/2000
(Continued)

OTHER PUBLICATIONS

International Search Report and Written Opinion (Application No. PCT/EP2017/076423) dated Feb. 22, 2018.
(Continued)

*Primary Examiner* — Boyer D Ashley
*Assistant Examiner* — Michael Vitale
(74) *Attorney, Agent, or Firm* — Burr & Brown, PLLC

(57) ABSTRACT

A motor spindle having a first electromagnetic drive system including a stator unit and a rotor unit which can rotate about an axis of rotation and has at least one rotor shaft and a tool receiver for receiving a machining tool. At least one bearing unit provides rotationally mounting of the rotor unit in the stator unit. The tool receiver is arranged in an end region of the rotor unit. The stator unit has a stator housing with an end section arranged in the end region of the rotor unit. The stator unit comprises at least one motor, having a second electromagnetic drive system, with a stator and a rotational rotor, wherein the rotor has at least one rotational housing element of the end section of the stator unit.

11 Claims, 3 Drawing Sheets

(51) Int. Cl.
*B23Q 17/00* (2006.01)
*B23Q 5/10* (2006.01)
*B23Q 1/00* (2006.01)
*B23Q 1/44* (2006.01)

(52) U.S. Cl.
CPC ............. *B23Q 5/10* (2013.01); *B23Q 17/002* (2013.01); *Y10T 408/95* (2015.01); *Y10T 409/30448* (2015.01); *Y10T 409/309352* (2015.01)

(58) Field of Classification Search
CPC .. Y10T 409/309408; B23Q 1/26; B23Q 1/44; B23Q 1/70; B23Q 5/045; B23Q 5/10; B23Q 5/04; B23C 2270/022
USPC .............. 409/144, 231, 230, 232; 408/239 R
See application file for complete search history.

(56) References Cited

U.S. PATENT DOCUMENTS

| | | | | |
|---|---|---|---|---|
| 6,431,802 | B1* | 8/2002 | Wahl | B23Q 1/44 409/201 |
| 6,461,802 | B1 | 8/2002 | Wahl | |
| 6,450,074 | B1* | 9/2002 | Yong-Chang | B23Q 1/0072 82/154 |
| 6,840,896 | B2* | 1/2005 | Endo | B23Q 5/043 408/137 |
| 7,048,479 | B2* | 5/2006 | Murai | B23Q 5/045 408/137 |
| 8,519,587 | B2* | 8/2013 | Tatsuda | B23Q 1/70 310/112 |
| 2005/0238447 | A1* | 10/2005 | Murota | B23Q 17/22 409/194 |
| 2008/0152451 | A1* | 6/2008 | Yamazaki | B23Q 11/04 409/231 |

FOREIGN PATENT DOCUMENTS

| | | | | |
|---|---|---|---|---|
| DE | 10348801 | B3 * | 5/2005 | ............... B23Q 1/44 |
| DE | 10 2005 021 202 | B3 | 8/2006 | |
| DE | 10 2006 030 159 | A1 | 10/2007 | |
| DE | 10 2006 046 502 | A1 | 4/2008 | |
| DE | 102009022815 | B3 * | 11/2010 | ........... B23B 29/323 |
| JP | H10-286735 | A1 | 10/1998 | |
| WO | WO-9201532 | A1 * | 2/1992 | ........... H02K 16/025 |

OTHER PUBLICATIONS

English translation of International Preliminary Report on Patentability (Chapter I) (Application No. PCT/EP2017/076423) dated May 2, 2019.

* cited by examiner

MOTOR SPINDLE

CROSS REFERENCE TO RELATED APPLICATIONS

This application is a continuation of International Application No. PCT/EP2017/076423 filed Oct. 17, 2017, which designated the United States, and claims the benefit under 35 USC § 119(a)-(d) of German Application No. 10 2016 119 821.8 filed Oct. 18, 2016, the entireties of which are incorporated herein by reference.

FIELD OF THE INVENTION

The present invention relates to a motor spindle.

BACKGROUND OF THE INVENTION

In machine tools, in particular in the case of milling machines, CNC machining centers having multiaxial machining, or the like, very frequently motor spindles are used which have tool clamps that allow automatic tool changing. This means that the tool is connected to the shaft of the machine-tool spindle such that it can be released automatically. For clamping, in the majority of cases, tool clamps are used that are usually connected to a set of springs. The resultant clamping force is transmitted, via the drawbar, to collet segments, which in turn connect the tool to the shaft.

For the purpose of releasing, the drawbar, and thus also the set of disk springs, is subjected to an axially acting release force that presses the springs together and thus enables the drawbar to be displaced axially, which in turn results in a release movement of the clamping segments in the region of the tool receiver.

The machining tools in this case have a standardized shank, in particular SK or HSK, which is held, or tensioned, in a tool receiver.

Especially with modern machine tools, multiaxial machining operations are possible. According to DE 198 50 708 C2, for this purpose, a motor spindle is mounted in a movable/pivotable manner, such that multiaxial machining of a workpiece can be realized.

Also already in use are so-called angle heads, in which case a drill bit, milling cutter or the like is aligned at an angle, in particular, at right angles, in relation to the rotation axis of the motor spindle. The rotating tool, or the drill bit/milling cutter, in this case is driven by the motor spindle, or the rotor shaft, the angle head in turn having a standardized shank, in particular, SK or HSK. However, the tool does not rotate (in alignment) about the rotation axis, but at an angle, in particular, at right angles, in relation thereto. In order to prevent the entire angle head from rotating about the rotation axis, these angle heads have, besides the shank, or HSK/SK, a holder, or a so-called torque support, which stops against, or is held, as it were "anchored", on the stator of the motor spindle.

Furthermore, already known, besides rigid, or passive, angle heads, are "active" angle heads, which have a turning system. This enables the angle head to adjust the alignment of the tool, e.g. of the drill bit, or to turn it about the rotation axis of the motor spindle. This enables, for example, a great variety of drilled holes, each aligned perpendicularly in relation to the surface, to be made on a bent profile, such as an aircraft airfoil, a sphere or the like, without the angle head, or machining tool, having to be changed. According to DE 10 2006 046 502 A1, the turning of the tool of the angle head is generated by means of the rotor shaft and an elaborate coupling system, or mechanical changeover system. Known from DE 10 2006 030 159 A1 is an angle head that has its own drive system for adjusting/turning the alignment of the tool. A disadvantage of such rotatable angle heads, however, is that an energy supply, or mechanisms, must additionally be provided.

Thus, besides passive, or rigid, angle heads, for the above-mentioned special applications, or machining operations, these rotatable angle heads have to be provided in addition and, if required, mounted on the motor spindle, which means additional set-up time, or tool changing. Accordingly, a large technical and financial resource requirement arises for the operator of a machine tool.

SUMMARY OF THE INVENTION

By contrast, an object of the present invention is to propose a motor spindle that can be used in a more flexible manner, and/or that reduces the constructional or economic resource requirement.

Accordingly, a release unit according to the present invention is distinguished in that the stator unit comprises at least one motor having a second electromagnetic drive system, and having a stator and a rotatable rotor, wherein the rotatable rotor has at least one rotatable housing element of the end portion of the rotatable rotor in the stator unit.

By means of such a motor spindle, new, additional functionalities can be realized in comparison with former motor spindles. Thus, for example, the rotor can be adjusted, or turned, i.e. driven, independently of, or separately from, the rotor unit, or rotor shaft, of the motor spindle. This means that the rotor of the motor can adjust/turn relative to the rotor unit, or rotor shaft, if necessary can be driven simultaneously and/or in respectively separate, or independent, operating phases, and, in particular, in order to realize a great variety of functionalities.

Consequently, not only can the tool be driven, as in the prior art, but a second machining element and/or a second functionality can be realized, if necessary, simultaneously with the machining by means of the tool.

Such an additional electric motor, integrated in the motor spindle, makes it possible a particularly space-saving motor spindle according to the present invention. Thus, with the often very limited available space, or structural space, in machine tools, the space-saving structural unit according to the present invention can be arranged in an advantageous manner, and also used, for example, for/in smaller cavities or recesses of the workpieces.

A space-saving motor spindle according to the invention can advantageously, with a "passive", or rigid, angle head, replace a conventional motor spindle having a comparatively large-volume, "actively" rotatable angle head. Consequently, according to the invention, comparatively small recesses of a workpiece can be machined. This means that, for example, drilled holes or the like, differing greatly in their alignment/orientation, can be realized by means of a single, rigid machining tool, or angle head. The set-up times for changing machining tools are thus not needed. Moreover, a "passive", or rigid, angle head or the like can be realized with a smaller volume, or made thinner/slimmer, such that, the highly integrated motor spindle according to the present invention, in combination with such a machining tool, or angle head, can be used to "dip" into smaller cavities, or recesses, undercuts or the like, which also increases the flexibility of the motor spindle or opens up further or novel application possibilities.

Accordingly, according to the present invention, a machining tool, or angle head, can be used, with it being possible to dispense with a separate electrical, hydraulic or mechanical energy supply. This allows a machine tool, or motor spindle/machine-tool spindle, according to the present invention to be operated in an economically particularly advantageous manner.

Consequently, hitherto usual, or standardized, tool components of corresponding machine-tool spindles/motor spindles can continue to be used, e.g. with tools, in particular angle heads, with HSK or SK, etc., without the need for them to be altered or adapted to the motor spindle according to the present invention. The tools, or angle heads, to be used are correspondingly economically favorable.

In an advantageous variant of the present invention, the rotatable housing element and/or the rotatable front face of the end portion is realized as a tool holder for holding the machining tool. It is thus possible to use a standardized machining tool, such as an angle head, which already comprises a so-called torque support, or anchor element, which is operatively connected to the tool holder, or to the housing element, and/or to the front face. In addition, fixed positioning of the machining tool, or angle head, is ensured during the machining/material removal operation, or rotation of the rotor unit.

Preferably, the housing element and/or the rotatable front face have/has a recess and/or stop face for the machining tool, or angle head. Concomitant rotation of the machining head, or angle head, or the like (when the rotor unit is rotating) can thereby advantageously be prevented. Consequently, even when the rotor unit is rotating, the alignment of the machining tool, or angle head, or tool element, such as a drill bit, milling cutter, etc., remains unchanged during the machining/material removal operation.

Alternatively, or in combination with this, the housing element and/or the rotatable recess and/or stop face for the machining tool, or the angle head, may not (only) on the front face, but advantageously on the circumference, or circumferential face, of the end portion aligned/exposed in the radial direction. This means that the housing element extends also or only extends circumferentially and/or advantageously has a circumferential face and/or recess or the like that is realized as a tool holder for holding the machining tool.

Advantageously, at least one position sensor is provided for sensing the rotational angle position of the rotor and/or of the housing element. This makes it possible, by means of an electronic/electrical control unit, inter alia, to sense and/or set, or adjust, a desired or required alignment of the machining tool, or angle head, or of the tool element such as a drill bit, milling cutter, etc., during the machining/material removal operation.

Preferably, the second electromagnetic drive system is arranged, in the direction of the rotation axis, at least partly, between the front face of the end portion and a connection flange for fixing the stator unit to a headstock. Thus, on the one hand, the motor spindle can be firmly fixed, in particular screwed-on, in a headstock, or a machine housing, of a receiver of the machine tool. On the other hand, the second electromagnetic drive system of the motor, in particular for turning the machining tool, or angle head, or the tool element such as a drill bit, milling cutter, etc. about the rotation axis, can advantageously be mounted in front of/next to the headstock, and demounted, or replaced, if necessary. This increases the efficiency of the motor spindle according to the present invention.

Preferably, the connection flange is realized as a motor connection flange. This means that advantageously arranged, or fixed/screwed-on, on the connection flange, on the one side is the first electromagnetic drive system, and on the other, or opposite, side is the second electromagnetic drive system. Thus, on the one hand, the motor spindle can be firmly fixed in the machine tool, and on the other hand the motor, in particular, the stator and/or the rotor, or parts thereof, can be demounted and re-mounted, or replaced, without much effort. This enables, for example, components of the motor that require more intensive maintenance to be replaced if necessary without much effort. This increases the efficiency of the motor spindle according to the present invention, in particular, in the case of impairment of the bearing assembly of the rotor or positioning sensor, etc.

In an advantageous embodiment of the present invention, the first electromagnetic drive system is arranged, at least partly, between the bearing unit and at least one bearing device for rotatably supporting the rotor unit in the stator unit. The end region of the motor spindle that faces toward the tool, or front end region, thus preferably has a first rolling bearing, in particular, a fixed bearing, or rolling bearing unit, in an X or O arrangement, and a second end region that faces away from the tool, or rear end region, has a second rolling bearing, in particular, a floating bearing, between which is arranged, substantially, the first electromagnetic drive system. A motor spindle according to the present invention thus has a length, aligned in the direction of the rotation axis, that is greater, in particular, twice as great, as a diameter of the stator housing.

The great advantage of the fixed/floating bearing combination in the case of such motor spindles is that the fixed bearing, which sits close to the tool receiver, reduces to a minimum axial movements of the spindle shaft in the front region. This, in turn, results in the tool being subjected to only very small axial displacements. This is of enormous advantage, particularly in modern machine tool construction, or in the case of modern high-performance motor spindles or the like, since nowadays there are very high demands, in respect of accuracy, placed upon corresponding machine tools such as CNC machines or the like. In this case an accuracy of not just a hundredth of a millimeter, but indeed also of a thousandth of a millimeter, must be adhered to.

In general, it is conceivable that even already existing, or already produced, machine tool spindles/motor spindles, and even those that have been in operational use for a long time, can be modified/retrofitted according to the present invention. This means that, for example, the so-called spindle head of an existing motor spindle can be replaced by a motor according to the present invention.

A stator unit advantageously has a cooling unit and/or a rotary feedthrough, or a media feedthrough for coolant and/or lubricant or the like, such that corresponding medium, or coolant and lubricant or the like, can be routed, e.g. frontally from one end of the release unit, through the release unit and through the rotor unit according to the present invention, to the tool clamp, or as far as the tool/workpiece, Preferably, the motor, or stator, has a cooling device. Advantageously, the cooling device comprises the same cooling medium, in particular, cooling fluid, as the cooling unit. Advantageously, there are connecting lines/channels between the cooling unit and cooling device. This reduces the resource requirement for cooling the motor unit according to the present invention, since, in particular, only two outer connection points are needed for the coolant/cooling system, or a closed cooling circuit.

Advantageously, the rotor of the motor comprises at least one permanent magnet of the second drive system. This means that according to the present invention the permanent magnets are arranged on/at the outer side/face of the rotor, or form, at least partly, the outwardly directed/facing surface of the rotor. If necessary, fixing components are provided for securely fixing the permanent magnets. This may be, for example, bindings and/or an adhesive layer, or an adhesive.

In general, the motor spindle and/or the motor according to the present invention may advantageously be realized as a synchronous or asynchronous machine.

Preferably, at least one bearing of the motor is realized as a crossed roller bearing. This enables absorption of relatively large axial and radial forces to be realized by means of a single rolling bearing. This means that an axial/radial bearing can be realized with only a single rolling bearing, such that particularly little structural space is required for this bearing arrangement.

In an advantageous variant of the present invention, at least one sensor is provided for sensing a position of the housing element and/or of the rotor. For example, at least one sensor, or proximity sensor, is provided, in particular, inductive or capacitive or optical or magnetic or ultrasonic/radar sensor.

Preferably, the sensor is realized as a rotary transducer (incremental and/or absolute) for sensing the angle of rotation. The revolutions, or the displacement distance/displacement angle, or the position of the housing element and/or of the rotor in the circumferential direction can thus be determined in an advantageous manner.

In general, a so-called angle head, having a standardized shank, or SK, HSK, etc., can be combined, or can act in combination with, tool clamps already commercially available hitherto. A multiplicity of disk springs are available in this case for clamping the tool in an operating position.

In an advantageous variant of the present invention, a sensor unit is provided for sensing an electrical motor parameter. For example, an evaluation of the power/power consumption and/or of the operating current, or operating voltage, of the second electrical drive system is provided. Thus, inter alia, no-load operation and/or an impairment can be sensed in an advantageous manner. Preferably, an actual/reference comparison is provided, wherein, for example, a small no-load current, or no-load power, and/or an electrical current are/is compared with a (stored) reference power or the like, in order to sense/determine proper working, or clamping/fixing of the tool, and/or the position, or functioning, of the angle head. For example, during the machining operation the machining tool, or the angle head, is fixed by means of a fixing/holding current, which can be sensed accordingly.

In addition, in recent years there have been increasing requirements in respect of material removal, and particular in respect of parameters such as feed, angular velocity. Thus, in the meantime tools are also being used wherein the actual thickness, or dimensional accuracy, is determined by means of corresponding sensors during the machining operation, and is used to control the machine tool, or to adjust the tool. For example, ultrasonic sensors are being used, which are arranged on/at the rotor shaft, or in/at the (rotating) tool.

Preferably, at least one electrical rotary feedthrough, or energy transmission system is used, which transmits electrical energy, or electrical signals/information, between the static part, or stator, and the rotating part, or rotor. The rotary feedthrough, or energy transmission system, in this case may be effected in the axial and/or radial direction/alignment. This means that the two components, or assemblies, that are moving/displacing/rotating relative to each other are aligned axially or radially.

This is realized, for example, by means of transmission coils, which consist substantially of two operatively connected coils (having ferrite cores), and between which there is a fixedly set, or defined, gap. The dimensional accuracy of the gap is very important, in order not to impair the energy transmission and/or the signal transmission. These transmission coils may therefore be arranged between the rotor and the stator and/or the rotor unit and the stator unit, especially in the front region next to the tool, or in the region of the front fixed bearing.

However, loop contacts or the like may also be used, to be realized as an electrical rotary feedthrough, or energy transmission system that transmits electrical energy, or electrical signals/information, between the static part, or stator, and the rotating part, or rotor.

In a preferred embodiment of the present invention, the stator unit, or the motor, in particular, the rotatable housing element, comprises the aforementioned sensor or sensors or the like. As an alternative to or in combination with this, however, an advantageous variant of the present invention may also be realized wherein the machining tool, with the tool element, such as an angle head or the like, comprises at least one sensor for sensing an electrical operating parameter.

It is particularly advantageous in this case if/that the motor spindle according to the present invention, in particular, the rotatable housing element, has an electrical connection unit, such as a plug connector or the like, for electrically connecting/transmitting electrical energy and/or signals between the machining tool and the motor spindle according to the present invention, in particular, the rotatable housing element. This enables electrical energy and/or control signals and/or operating/measurement signals to be supplied, or transmitted, to, for example, a drive and/or a sensor of the machining tool. For example, this advantageously enables sensor signals to be transmitted, by means of a connection unit, or plug connector, or the like, from the sensor of the rotatable machining tool to the rotatable housing element and, if necessary, additionally to an advantageous electrical/electronic monitoring/control unit of the motor spindle and/or of the machine tool. This additionally increases the functionality, or flexibility, the motor spindle according to the present invention.

BRIEF DESCRIPTION OF THE INVENTION

An exemplary embodiment of the present invention is represented in the drawing and is explained in greater detail in the following on the basis of the figures.

DETAILED DESCRIPTION OF THE INVENTION

Figure 1:
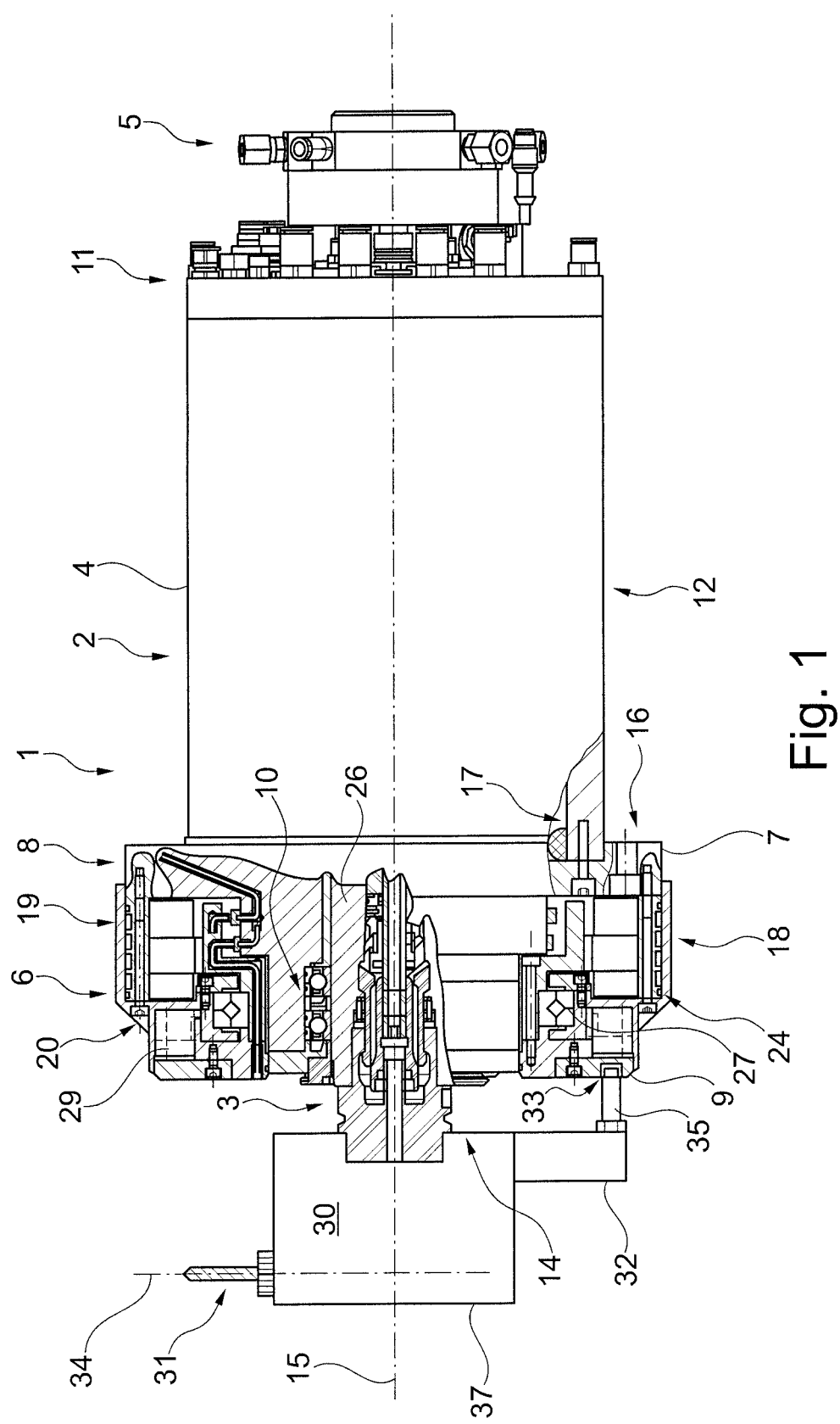
FIG. 1 shows, in schematic form, a first motor spindle according to the present invention, having a mounted angle head, or machining tool.

Represented in each of the figures is a motor spindle 1, having a stator unit 2, and having a rotatable rotor unit 3 that can be driven about a rotation axis 15 and comprises a rotor shaft 26. The stator unit 2 comprises, inter alia, a stator sleeve 4 of a stator housing 8, a release unit 5, a connection flange 7, and a motor 6 having a rotatable housing element 9 within the meaning of the present invention.

The motor spindle 1 additionally comprises a tool receiver 14, having a collet 13 of a clamping system, a front bearing 10, which is preferably realized as a preloaded bearing unit 10 having two rolling bearings/ball bearings, and a rear bearing 11, not represented in greater detail, and a first electrical drive system 12, not represented in greater detail, which is arranged substantially between the two bearings 10, 11, as is known to persons skilled in the art. Also not represented, but known to persons skilled in the art, is a (fluid) cooling system of the first electrical drive system 12, inside the stator sleeve 4, or the stator unit 2.

The tool receiver 14 in this case comprises a front face, or end face, 42, which realizes the foremost point/part of the rotor unit 3, or of the motor spindle 1 within the meaning of the present invention. The tool 30 is fastened thereto.

The connection flange 7 is screw-connected (screw connection 17), on the one hand, to the stator sleeve 4, and on the other hand it may be fixedly screw-connected/fixed to a headstock of the machine tool, which is not represented in greater detail. For this purpose, the connection flange 7 has advantageous drilled holes 16 for screws. This allows advantageous fastening in the machine tool, which if necessary can be disassembled, to enable the entire motor spindle 1 to be replaced, serviced, etc.

At the same time, advantageously, a stator 18 of the motor 6 is fixedly mounted/filed, by means of screws 19 or the like, to the connection flange 7. The stator 18 comprises a (fluid) cooling system 24 of a second electrical drive system 20. The second electrical drive system 20 preferably has drive coils 21 of the stator 18 and permanent magnets 22 of the rotor 23.

Additionally provided is an advantageous motor bearing 27, in particular, a cross roller bearing 27, for supporting the rotor 23, which is rotatable about the rotation axis 15 in the stator 18, and at least one sensor 29, or rotary transducer/encoder. The angular position, or position of the rotor 23 in relation to the stator 18, can thus be sensed and, for example, by means of a control/monitoring unit, not represented, the thus advantageously known position/angular position of the rotor 23, or of the rotatable housing element 9, can be used to determine and set/define the position of a machining tool 30 having a tool element 31, such as a drill bit, milling cutter or the like.

It is clear from FIG. 1 that the machining tool 30 has a torque support 32, as it were as an "anchor", a bolt 35, pin etc. of the machining tool 30 projecting into a recess 33 of a front side 41 of the rotatable housing element 9 of the rotor 23, or being delimited therein. Consequently, as the rotor 23 is turned, a housing 37 of the machining tool 30 is rotated/turned concomitantly, such that the alignment to the tool element 31 changes/turns. This means that a machining axis 34 of the tool element 31, or of the machining tool 30, can be adjusted/turned about the rotation axis 15. Advantageous applications, or drilling/machining of, for example, bent workpiece surfaces, such as bent airfoil profiles of aircraft wings, spheres (internal, external) can thereby be machined, or drilled.

It thus becomes clear that, according to the present invention, the aforementioned applications do not require machining tools 30 that have their own elaborate and relatively large-volume drive, or drive system, but that, with the motor spindle 1 according to the present invention, a small-volume, or space-saving, inexpensive machining tool 30, in particular, having a bevel gearing (axis 15 and axis 34 are angled, in particular, aligned at right angles to each other), is sufficient. Accordingly, standardized machining tools 30, in particular, equipped with a taper shank, HSK, etc., can be used.

Also conceivable are further novel, advantageous applications of the present invention, such as drilling/milling of a workpiece by means of a tool such as a milling cutter, drill bit with HSK, that is rotated/driven by means of the rotor unit 3, or the rotor shaft 26, and an advantageous second machining of the workpiece such as, for example, polishing of a surface of the workpiece, or the like, being able to be effected in addition and/or simultaneously, on the outside of the rotatable housing element 9 of the rotor 23. This is an entirely novel functionality of a motor spindle 1.

Furthermore, the motor 6 has a sensor 36 for sensing a machining parameter and/or a motor parameter. For example, a presence of a (correctly) fastened tool, or machining tool 30, on the motor spindle 1, or in the clamping system, or in the tool receiver 14 can be detected. The (electrical) energy/signal line of the sensor 36 may be realized from the rotor 23 to the stator 18, on the one hand, by means of a loop contact 39 and/or, on the other hand, contactlessly within the rotor element 40, in the axial or radial direction.

In principle, instead of the sensor 36, an advantageous plug connector (not represented in greater detail), by which electrical energy and/or information/signals can be exchanged/transmitted between the motor spindle 1, or the rotatable housing element 9 of the rotor 23, and the machining tool 30, may be provided as an alternative or in combination.

Figure 2:
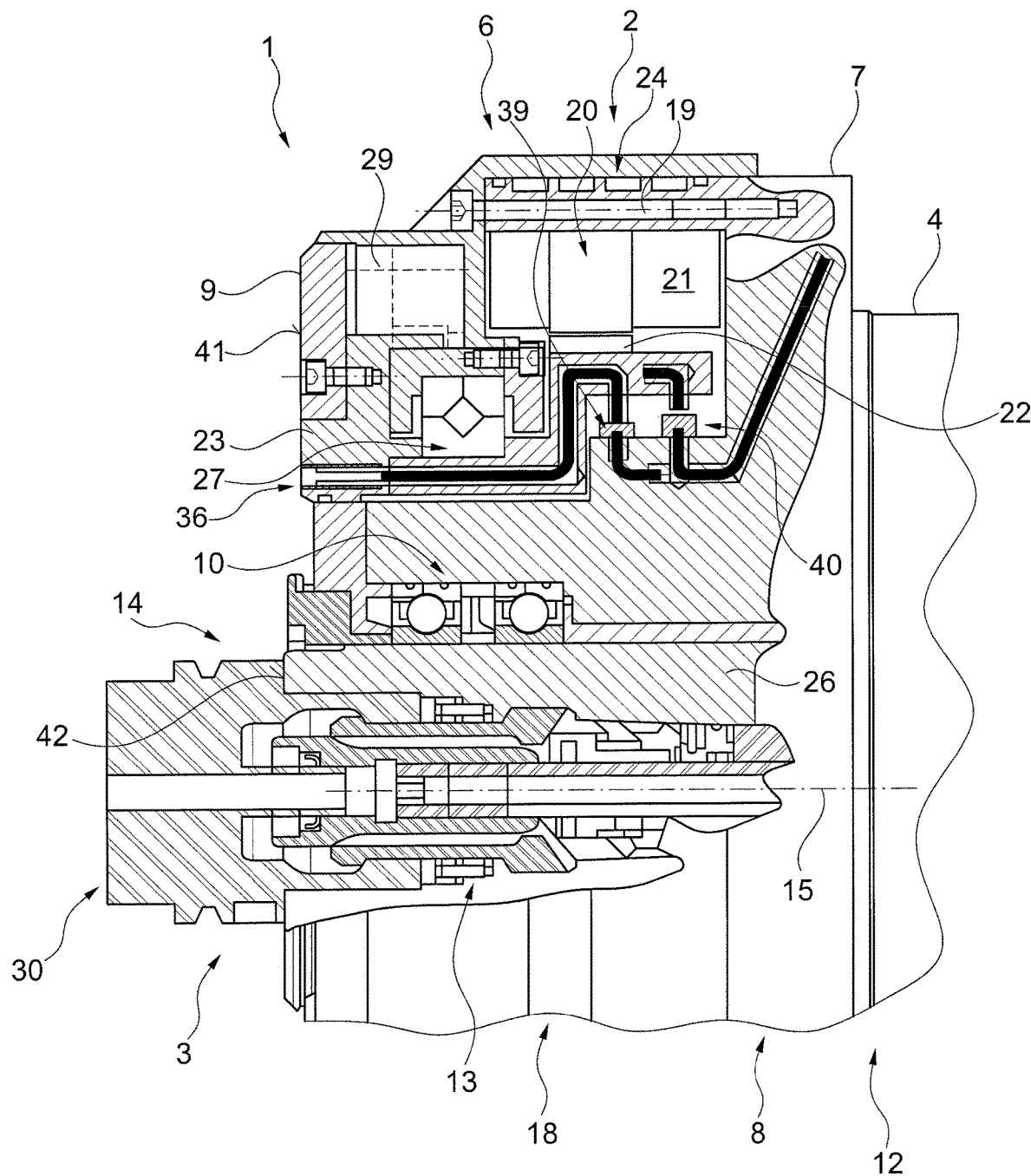
FIG. 2 shows, in schematic form, an enlarged, partially sectional detail through the first motor spindle according to FIG. 1.
Figure 3:
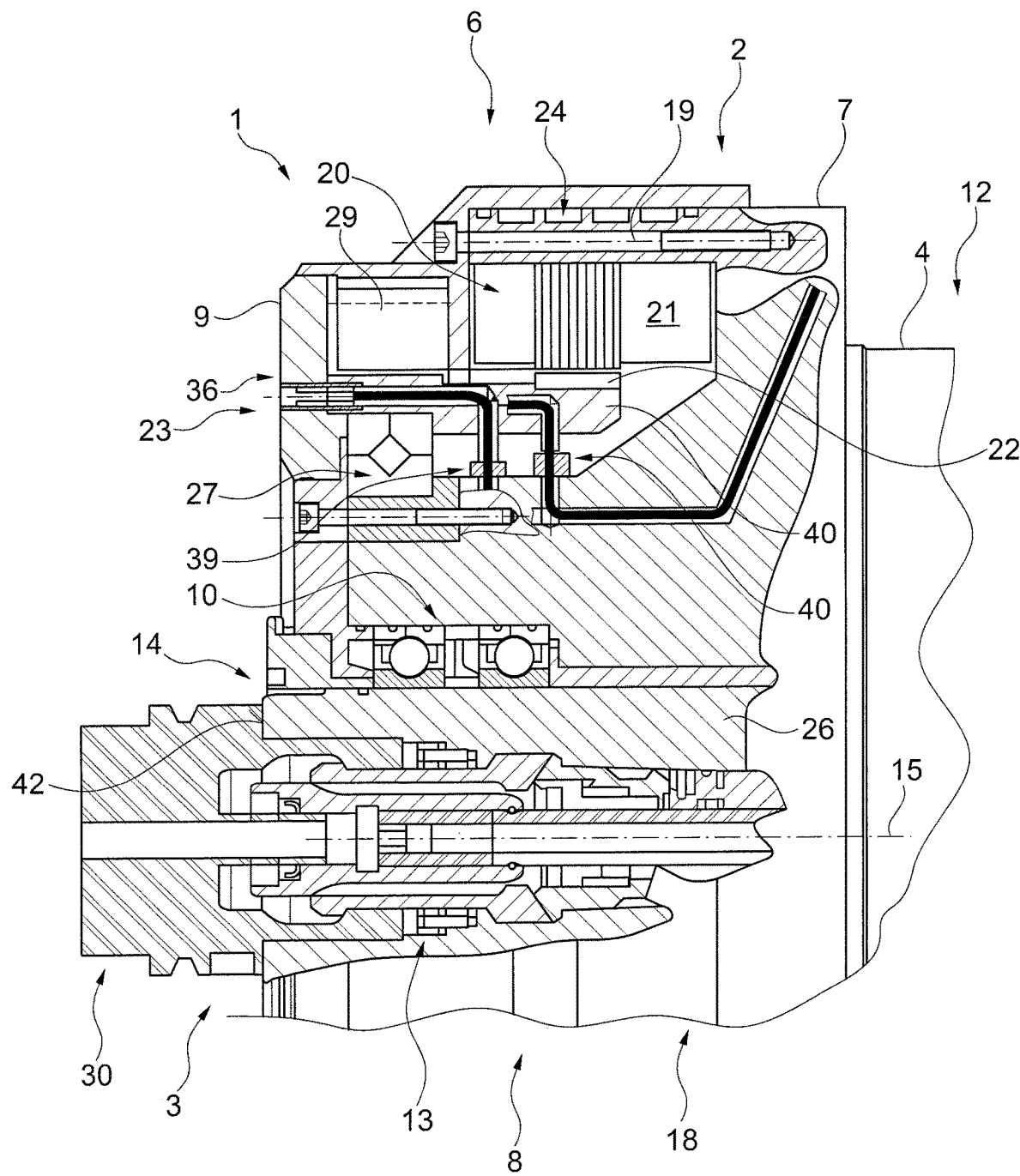
FIG. 3 shows, in schematic for, an enlarged, partially sectional detail through a second motor spindle according to the present invention.

A substantial difference between the two variants according to FIGS. 1, 2 and 3 is that, in the case of the first variant (see FIGS. 1 and 2), the rotatable components, or the rotor 23, are arranged between static, or non-rotatable, components of the stator 18, the bearing 27 being static, or non-rotatable, at the outside circumference, i.e. the outer ring is stationary and the inner ring rotates. In the case of an impairment of the bearing 27, in this case preferably the stator 18 is demounted from the flange by means of the screws 19, and replaced.

In the case of the second variant according to FIG. 3, the rotatable components, or the rotor 23, are likewise arranged between static, or non-rotatable, components of the stator 18, the bearing 27 being rotatable at the outside circumference, i.e. the inner ring is stationary and the outer ring rotates. In the case of an impairment of the bearing 27, in this case preferably only the rotor 23 is demounted/screwed-off, in particular, the housing element 9 and a rotor element 40, including the bearing 27 and the sensor 36. This requires particularly little effort, and is also particularly inexpensive.

In general, by means of the present invention, a so-called steplessly variable counter-bearing can be realized (by means of the housing element 9) at the so-called spindle head, or the so-called spindle nose, which rotates about the rotation axis 15 and is realized concentrically therewith. In addition, an advantageous actuating drive can be realized by means of the motor 6, to be used for driving/moving/adjusting an additional axis of the tool 31, or machining tool 30.

In principle, it is particularly advantageous in the case of the present invention that the rotor assembly, or the rotor 23 and/or the entire motor 6, and be replaced and/or retrofitted without much effort. In addition, the sensor 36 can be replaced without much effort.

All of this opens up novel functionalities of the motor spindle 1, can be realized in a particularly space-saving manner, or with little space, and allows particularly cost-effective operation.

The invention claimed is:

1. A motor spindle comprises: a stator unit, which comprises a stator sleeve of a stator housing and at least one motor having a rotatable rotor that has at least one rotatable housing element, a rotor unit, a first electromagnetic drive system, which is arranged in the stator sleeve of the stator housing, and a second electromagnetic drive system having drive coils of a stator and permanent magnets of the rotatable rotor, the rotor unit is rotatable about a rotation axis and which has at least one rotor shaft and a tool receiver having a collet for receiving a machining tool, wherein at least one bearing unit is provided for rotatably supporting the rotor unit in the stator unit, wherein the tool receiver is arranged at an end point of the rotor unit such that a front end face of the tool receiver is a foremost end of a front face of the motor spindle, wherein a front portion of the stator housing is arranged to be adjacent to the tool receiver, wherein the second electromagnetic drive system, which has the drive coils of the stator and the permanent magnets of the rotatable rotor, is arranged in the front portion of the stator housing such that both the drive coils of the stator and the permanent magnets of the rotatable rotor of the second electromagnetic drive system are arranged radially adjacent to the tool receiver, wherein the at least one rotatable housing element is arranged on a front end portion of the rotatable rotor, such that the at least one rotatable housing element is configured to be driven about the rotation axis with respect to the front end face of the tool receiver by the rotatable rotor via the at least one motor at least one of independently and separately from the rotor unit.

2. The motor spindle as claimed in claim 1, wherein the at least one rotatable housing element comprises at least one rotatable front face side that is rotatable about the rotation axis with respect to the front end face of the tool receiver.

3. The motor spindle as claimed in claim 1, wherein at least the rotatable rotor and/or the at least one rotatable housing element are/is arranged concentrically with the rotation axis of the rotor unit.

4. The motor spindle as claimed in claim 1, wherein the at least one rotatable housing element and/or at least one rotatable front face side of the at least one rotatable housing element are/is realized as a tool holder for holding the machining tool.

5. The motor spindle as claimed in claim 1, wherein the machining tool comprises at least one machining element that is rotatable about a machining axis and is driven by the rotor unit, wherein the machining axis is arranged at an acute angle or at right angles to the rotation axis of the rotor unit.

6. The motor spindle as claimed in claim 1, further comprising at least one position sensor for sensing a rotational angle position of the rotatable rotor and/or of the at least one rotatable housing element.

7. The motor spindle as claimed in claim 1, wherein the at least one rotatable housing element and/or at least one rotatable front face side of the at least one rotatable housing element are/is arranged, in the direction of the rotation axis, at least partly, between the at least one bearing unit and the front end face of the tool receiver.

8. The motor spindle as claimed in claim 7, wherein the at least one rotatable housing element and/or the at least one rotatable front face side of the at least one rotatable housing element are/is arranged, in the direction of the rotation axis between a connection flange for fixing the stator unit to a headstock and the front end face of the tool receiver.

9. The motor spindle as claimed in claim 1, wherein the second electromagnetic drive system is arranged, in the direction of the rotation axis, at least partly, between the front end face of the tool receiver and a connection flange for fixing the stator unit to a headstock.

10. The motor spindle as claimed in claim 1, wherein the first electromagnetic drive system is arranged, at least partly, between the at least one bearing unit and at least one bearing device for rotatably supporting the rotor unit in the stator unit.

11. A machine tool comprising: the motor spindle according to claim 1.

* * * * *